(12) United States Patent
Saussele

(10) Patent No.: US 9,563,224 B2
(45) Date of Patent: **\*Feb. 7, 2017**

(54) SYSTEM AND METHOD FOR SYSTEM-LEVEL POWER POINT CONTROL OF A PHOTOVOLTAIC DEVICE

(71) Applicant: Robert Bosch GmbH, Stuttgart (DE)

(72) Inventor: John Saussele, Davidson, NC (US)

(73) Assignee: Robert Bosch GmbH, Stuttgart (DE)

( \* ) Notice: Subject to any disclaimer, the term of this patent is extended or adjusted under 35 U.S.C. 154(b) by 359 days.

This patent is subject to a terminal disclaimer.

(21) Appl. No.: 14/189,806

(22) Filed: Feb. 25, 2014

(65) Prior Publication Data

US 2014/0176026 A1 Jun. 26, 2014

Related U.S. Application Data

(63) Continuation of application No. 13/749,604, filed on Jan. 24, 2013, now Pat. No. 8,680,838.

(Continued)

(51) Int. Cl.
*G05F 5/00* (2006.01)
*H02M 7/42* (2006.01)
(Continued)

(52) U.S. Cl.
CPC .................. *G05F 5/00* (2013.01); *H02M 7/42* (2013.01); *H02M 7/493* (2013.01); *H02P 3/14* (2013.01);
(Continued)

(58) Field of Classification Search
CPC ....................................................... H02M 7/02
(Continued)

(56) References Cited

U.S. PATENT DOCUMENTS 6,448,489 B2 9/2002 Kimura et al.
6,949,843 B2 9/2005 Dubovsky
(Continued)

FOREIGN PATENT DOCUMENTS

CN 101826741 9/2010
JP 04183228 A 6/1992
(Continued)

OTHER PUBLICATIONS

International Preliminary Report on Patentability and Written Opinion for Application No. PCT/US2013/023032 dated Aug. 7, 2014 (9 pages).

(Continued)

*Primary Examiner* — Robert Deberadinis
(74) *Attorney, Agent, or Firm* — Michael Best & Friedrich LLP

(57) ABSTRACT

Controlling a photovoltaic system includes providing a photovoltaic device having a variable DC voltage output and a variable DC current output. The photovoltaic device has a combination of a voltage output level and a current output level corresponding to a predetermined, desired power point. A DC power supply is connected in a parallel and/or series combination with the photovoltaic device. A DC load is connected in series to the combination of the DC power supply and the photovoltaic device such that the load is powered by the combination. A characteristic of the DC power supply is adjusted such that the voltage output and the current output of the photovoltaic device substantially match the voltage output level and the current output level corresponding to the desired power point.

50 Claims, 10 Drawing Sheets

Related U.S. Application Data

(60) Provisional application No. 61/590,254, filed on Jan. 24, 2012.

(51) Int. Cl.
  *H02M 7/493* (2007.01)
  *H02P 3/14* (2006.01)
  *H02M 7/02* (2006.01)
  *H02J 3/38* (2006.01)

(52) U.S. Cl.
  CPC ............... *H02J 3/385* (2013.01); *Y02E 10/58* (2013.01); *Y10T 307/352* (2015.04); *Y10T 307/406* (2015.04)

(58) Field of Classification Search
  USPC ............................................. 307/31, 43, 140
  See application file for complete search history.

(56) References Cited

U.S. PATENT DOCUMENTS

| | | | |
|---|---|---|---|
| 8,680,838 B2 * | 3/2014 | Saussele | G05F 5/00 323/299 |
| 2001/0035180 A1 | 11/2001 | Kimura et al. | |
| 2003/0066555 A1 | 4/2003 | Hui et al. | |
| 2010/0073969 A1 | 3/2010 | Rajagopalan et al. | |
| 2010/0277002 A1 | 11/2010 | Folts et al. | |
| 2010/0282289 A1 | 11/2010 | Wu et al. | |
| 2011/0031925 A1 | 2/2011 | Simburger et al. | |
| 2011/0080047 A1 | 4/2011 | Li | |
| 2011/0148195 A1 | 6/2011 | Lee | |
| 2011/2015640 | 9/2011 | Donnelly et al. | |
| 2011/0273130 A1 | 11/2011 | Lee et al. | |
| 2012/0047386 A1 | 2/2012 | Matsui | |
| 2013/0046416 A1 | 2/2013 | Osako et al. | |

FOREIGN PATENT DOCUMENTS

| | | |
|---|---|---|
| JP | 06266457 A | 9/1994 |
| JP | 2007300728 A | 11/2007 |
| WO | 2009142698 | 11/2009 |
| WO | 2010/125878 | 11/2010 |
| WO | 2011109514 | 9/2011 |

OTHER PUBLICATIONS

International Search Report for Application No. PCT/US2013/023032 dated May 10, 2013 (4 pages).

Chinese Patent Office Action for Application No. 201380006543.8 dated Apr. 1, 2016 (18 pages, including English translation).

Yang Haizhu et al., "Research on maximum power point tracking control based upon a DSP-controlled grid-connected photovoltaic inverter," Acta Energiae Solaris Sinica, vol. 26, No. 6, 2005, pp. 760-765.

Notification of Reasons for Rejection for Japanese Application No. 2014-554833, dated Oct. 13, 2016, 7 pages.

* cited by examiner

SYSTEM AND METHOD FOR SYSTEM-LEVEL POWER POINT CONTROL OF A PHOTOVOLTAIC DEVICE

RELATED APPLICATIONS

This application is a continuation of U.S. application Ser. No. 13/749,604 filed on Jan. 24, 2013, entitled "System and Method for System-Level Power Point Control of a Photovoltaic Device." The '604 application is a non-provisional of, and claims the benefit of, provisional application 61/590,254, filed Jan. 24, 2012, entitled "System and Method for System-Level Power Point Control of a Photovoltaic Device." The contents of the foregoing applications are hereby incorporated by reference herein in their entirety.

BACKGROUND OF THE INVENTION

Field of the Invention

The present invention relates to a system and method of controlling a photovoltaic device.

Description of the Related Art

A photovoltaic (PV) device may be in the form of a cell, module or array. In order to extract maximum power from such a PV device, the device may be operated at the maximum power point (MPP) on the current vs. voltage (I-V) curve for that device, as shown in FIG. 1. Because this maximum power point varies with irradiance, temperature, aging, and other conditions, PV systems employ a function known as Maximum Power Point Tracking (MPPT) in order to keep the PV devices operating at or close to the MPP. The MPPT function is typically performed using circuitry and algorithms within the Direct Current (DC) to Alternating Current (AC) PV inverter (referred to herein as the "inverter") connected between the PV devices and utility grid or AC electrical loads. Alternately, the MPPT function may also be implemented as circuitry and algorithms within a DC optimizer (or DC/DC converter) connected directly to the PV devices, as shown in system 20 of FIG. 2.

SUMMARY OF THE INVENTION

The invention may provide a method to enable PV devices to operate at or near the most efficient power point or other desired power point on the I-V curve. The inverter and/or DC optimizers may be eliminated or reduced in size/complexity for PV installations utilizing the invention.

Within a building or other system where some or all of the electrical loads are designed to operate directly on DC power, and are connected to the PV devices and other DC electrical power sources via a DC bus (also known as a "DC-microgrid"), the MPPT function may be performed on a building or system level by dynamically adjusting the operating conditions of the DC loads and/or DC sources connected to the DC bus in order to keep the PV system operating at or near MPP. This concept may be referred to herein as "System Level MPPT".

Performing the MPPT function on the system level may eliminate the need for dedicated MPPT circuits and additional power conversions with their corresponding electrical losses. Thus, performing the MPPT function on the system level may result in a less costly and more reliable system. In systems where the DC load is great enough to use all available DC PV power during a vast majority of the time when PV power is being generated (e.g., for food refrigeration, buildings with consistent daytime lighting loads, data centers, etc.), the inverter including the MPPT function may be completely eliminated from the system, as shown in FIG. 3c. With the elimination of the inverter, the MPPT function may still need to be performed in order to harvest maximum PV power, and system level MPPT offers an economic alternative to accomplish this goal. As a simple example, system-level MPPT may be performed by dynamically adjusting the voltage of a DC power supply that is connected in parallel with PV devices. DC loads may be connected to the parallel combination of the DC power supply and the PV devices. The voltage of the DC power supply may be dynamically adjusted in such a way as to allow the PV devices to contribute power to the DC loads at or near the MPP of the PV devices. The DC loads may also be designed to operate over the wider dynamic DC bus voltage range corresponding to the MPP voltage. This example may only make sense when the power consumed by the DC loads is normally higher than the PV output power (the DC power supply contributes the balance of power needed by the DC loads), and may require isolation diodes on the PV devices and/or DC power supply to prevent backfeeding between the two DC sources. DC microgrid 300 may be particularly suitable for this situation, wherein DC microgrid 300, shown in FIG. 3c, does not include an inverter between the PV array and the electrical grid.

Larger PV device power capacity may also be optimized to a smaller DC load profile from an economic payback standpoint, since system level MPPT would still allow for a reduced size inverter with or without MPPT function in applications where PV power generation may substantially exceed the power consumed by the DC load, as shown in FIG. 3a.

A PV device acts as an electrical power source, but not like a typical regulated voltage or current source. Instead, the PV device can supply power over a variety of different voltages and corresponding currents, represented by the current-voltage (I-V) curve. In addition, the I-V curve itself varies based on temperature, irradiance, and other factors. To extract maximum power, it is desirable to operate the PV device at the "knee" of the I-V curve, which is the maximum power point (MPP) on the curve that is applicable under the particular conditions. The invention may enable the PV device to be "forced" to operate at any point on the I-V curve by adjusting the operating conditions of other devices in the circuit connected to the PV device. Pulling more current from the PV device into the attached circuit may lower the operating voltage on the I-V curve. As an example, pulling more current from the PV device may be accomplished by connecting electrical loads which can be adjusted to "sink" more electrical current, thus lowering the effective load resistance in the circuit. Pulling less current from the PV device into the attached circuit may raise the operating voltage on the I-V curve. For example, pulling less current from the PV device may be accomplished by supplying more current to the connected electrical loads from a DC power supply which is connected in parallel to the PV device, effectively unloading some of the current burden from the PV device without affecting the total amount of power delivered to the electrical loads. Through the action of controlled "sourcing" of power from a DC power supply or other source when needed, and/or controlled "sinking" power to DC loads and adjustable inverters, the PV device can be "steered" to operate at any voltage and current on the I-V curve, including the MPP. Note that the stated examples and drawings show a DC power supply connected in parallel to the PV device, where the voltage is adjusted. However, the same concept may be applied to a DC power supply connected in series with the PV device, where the current is adjusted to similarly "force" the PV device to operate at a certain current, and therefore a defined point on the I-V curve. For simplicity of illustration, the parallel configuration is used in most examples and drawings herein.

The invention comprises, in one form thereof, a method of controlling a photovoltaic system, including providing a photovoltaic device having a variable DC voltage output and a variable DC current output. The photovoltaic device has a combination of a voltage output level and a current output level corresponding to a maximum power point. A DC power supply is connected in a parallel and/or series combination with the photovoltaic device. A DC load is connected to the combination of the DC power supply and the photovoltaic device such that the load is powered by the combination. A characteristic of the DC power supply is adjusted such that the voltage output and the current output of the photovoltaic device substantially match the voltage output level and the current output level corresponding to the maximum power point or other desired power point.

The invention comprises, in another form thereof, a photovoltaic system including a photovoltaic device having a variable DC voltage output and a variable DC current output. The photovoltaic device has a combination of a voltage output level and a current output level corresponding to a maximum power point. A DC power supply is connected in a parallel and/or series combination with the photovoltaic device. A DC load is connected to the combination of the DC power supply and the photovoltaic device such that the load is powered by the combination. The DC power supply has an adjustable output such that the voltage output and the current output of the photovoltaic device are adjustable in response to an adjustment of the output of the DC power supply. Control means is coupled to the DC power supply and automatically adjusts the output of the DC power supply such that the voltage output and the current output of the photovoltaic device substantially match the voltage output level and the current output level corresponding to the maximum power point or other desired power point.

The invention comprises, in yet another form thereof, a method of controlling a photovoltaic system, including providing a photovoltaic device having a variable DC voltage output and a variable DC current output. The photovoltaic device has a combination of a voltage output level and a current output level corresponding to a maximum power point. A DC-to-AC inverter is connected to an output of the photovoltaic device. A DC load is connected to the output of the photovoltaic device. A current draw of the DC-to-AC inverter is adjusted such that the voltage output and the current output of the photovoltaic device substantially match the voltage output level and the current output level corresponding to the maximum power point.

DESCRIPTION OF THE PRESENT INVENTION

Figure 1:
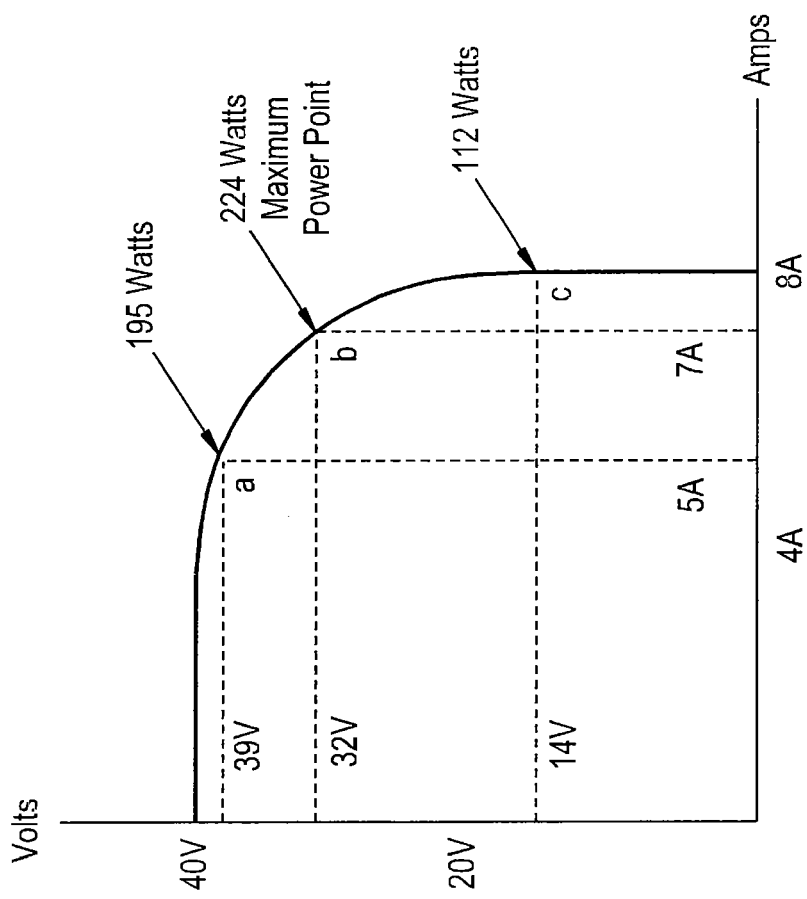
FIG. 1 is a voltage vs. current plot illustrating the maximum power point for a PV system.
Figure 2:
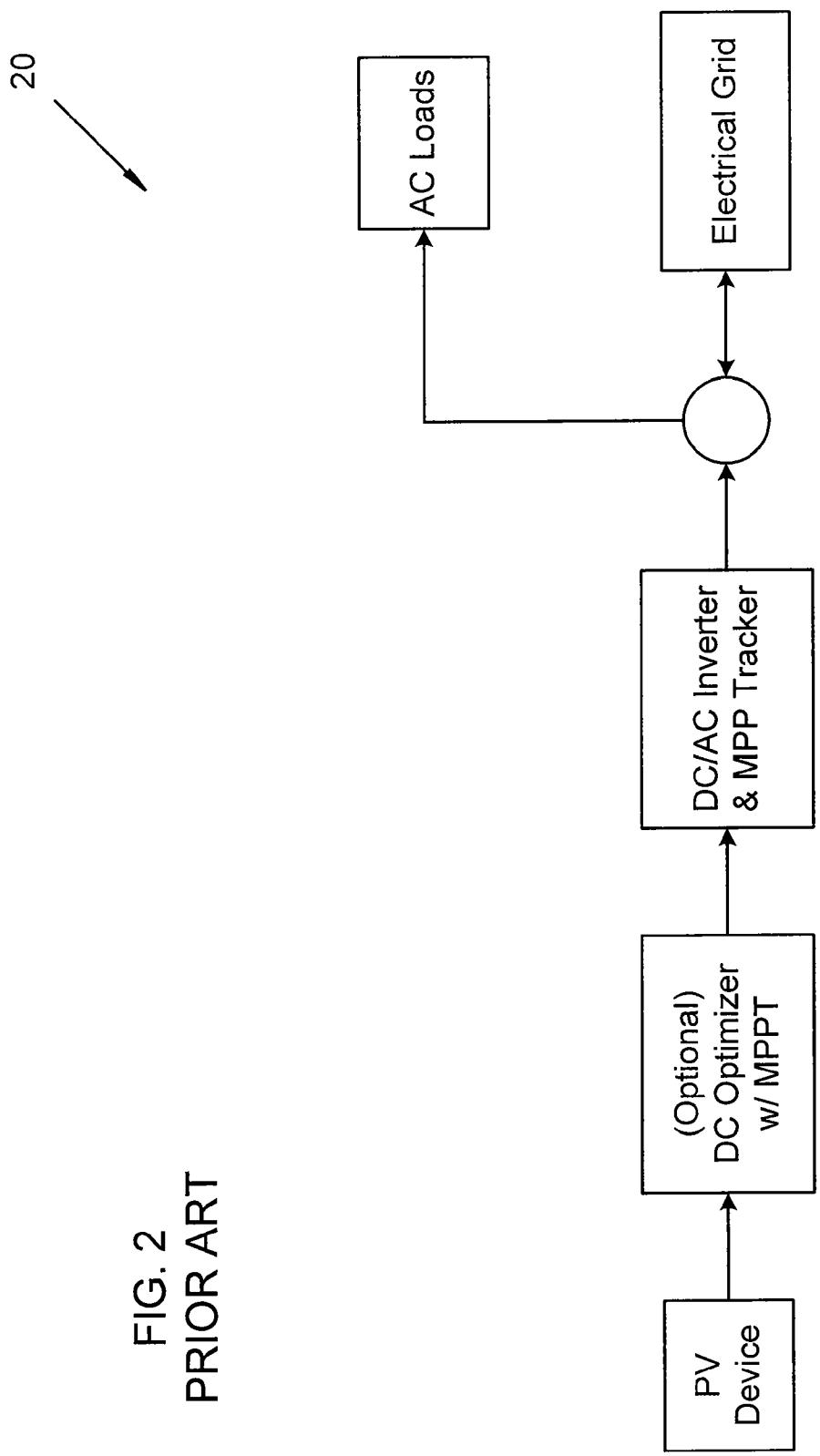
FIG. 2 is a block diagram illustrating a known photovoltaic system of the prior art.
Figure 3A:
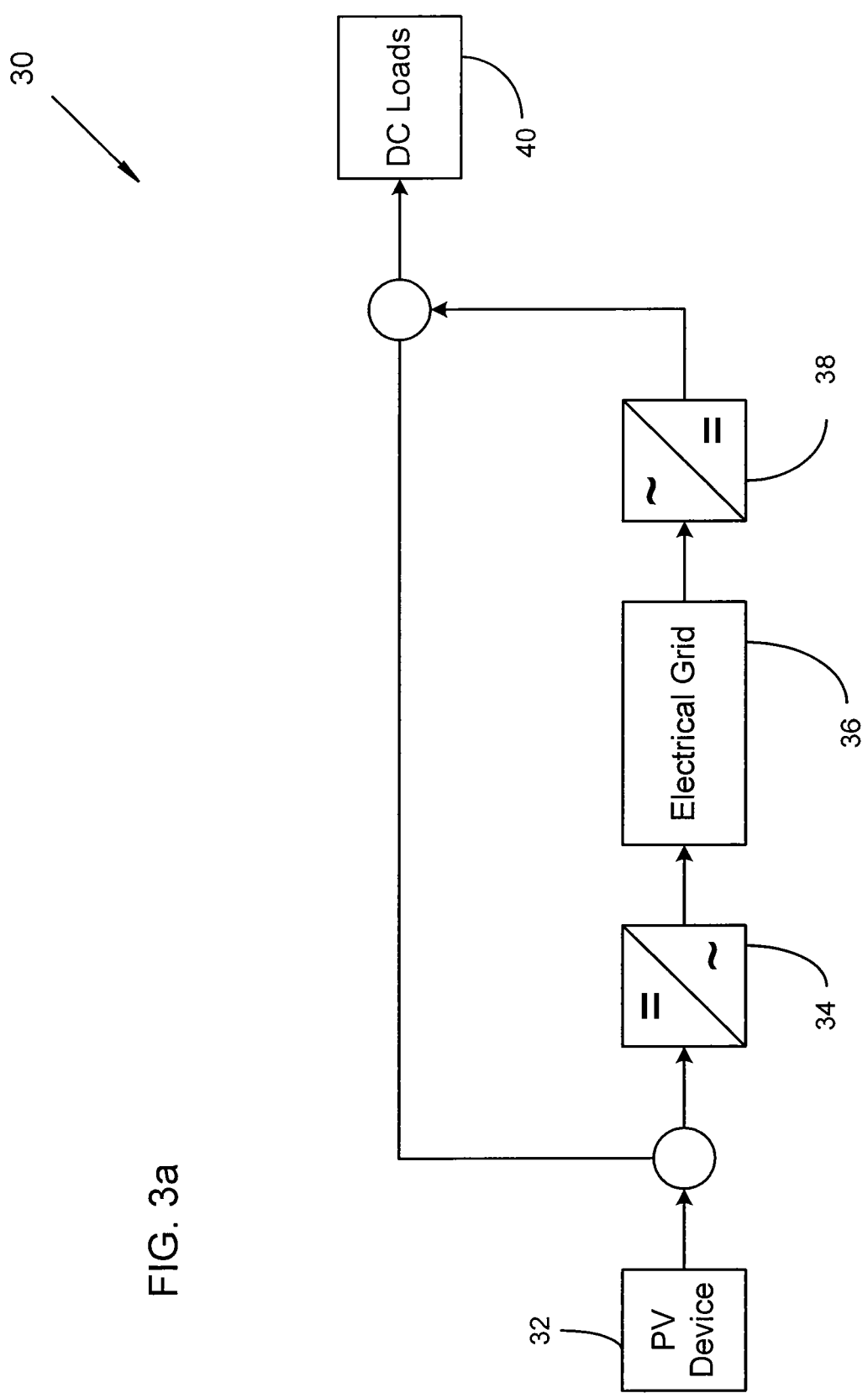
FIG. 3a is a block diagram of one embodiment of a DC microgrid of the present invention.
Figure 3B:
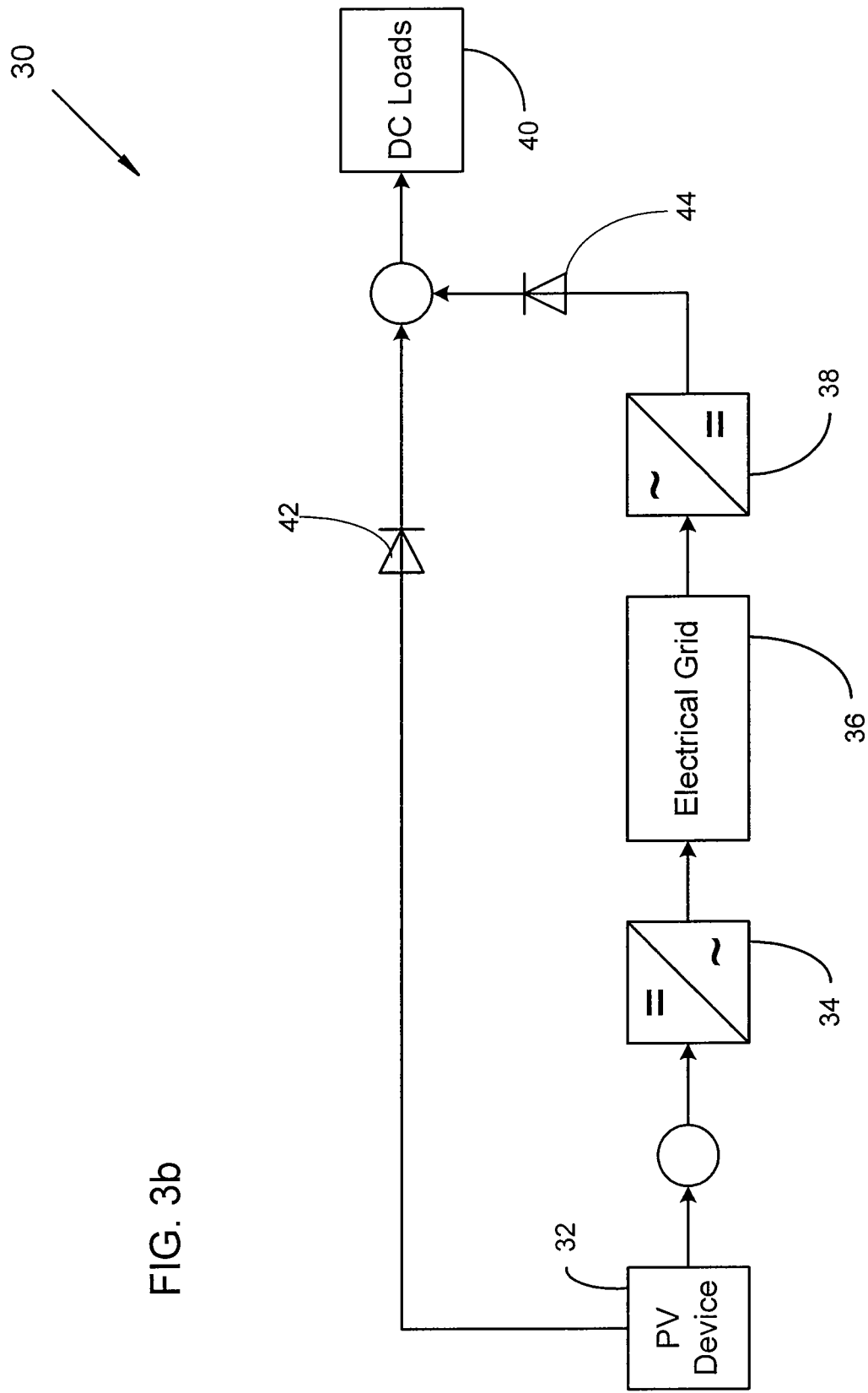
FIG. 3b is a block diagram of another embodiment of a DC microgrid of the present invention.

Referring now to FIG. 3a, there is shown a DC microgrid 30 including a PV device 32, a variable, controllable inverter 34, an electrical grid 36, a variable, controllable DC power supply 38, and variable, controllable DC loads 40. DC loads 40 may be connected to the parallel combination of PV device 32 and DC power supply 38. A variable DC voltage corresponding to the MPP of the PV device may be created on the common DC bus and may be applied to DC loads 40. When DC loads 40 consumes less power than is provided by PV device 32, then inverter 34 may convert DC power from PV device 32 into AC power that is provided to grid 36. On the other hand, when PV device 32 does not provide all of the power that is consumed by DC loads 40, then power supply 38 may convert AC power from grid 36 into DC power that is applied to DC loads 40. For example, the output of power supply 38 may be controlled such that the output of PV device 32 is at the MPP. That is, the power output of PV device 32 may be controlled by changing the voltage output of power supply 38, which effectively changes where the PV device is operating on the I-V curve. Similarly, the DC current draw of the inverter may be adjusted, particularly when the PV device power is above the DC load requirements, which would again control where the PV device operates on the I-V curve. Note that System-level MPPT may be performed by controlling one or more of the non-PV sources and loads in the system, while the other sources and loads may remain fixed (not controlled or adjustable). In order to implement the above-described control, inverter 34 and/or power supply 38 may function as a control device and may each include a processor or application-specific integrated circuit (ASIC), for example, for this purpose in cooperation with control software. As shown in FIG. 3b, isolation diodes 42, 44 may be provided to prevent backfeeding DC between PV device 32 and DC power supply 38.

Figure 3C:
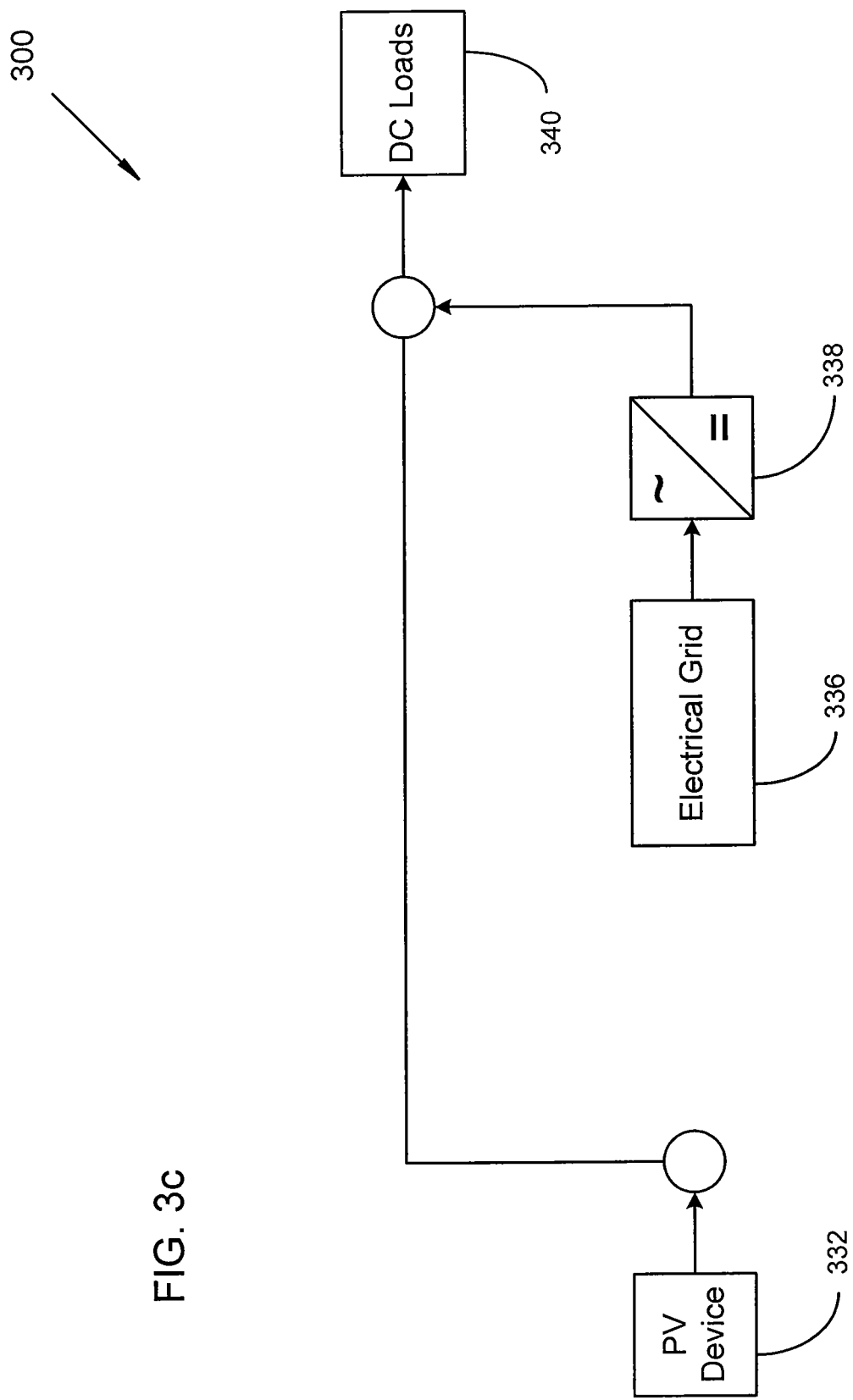
FIG. 3c is a block diagram of yet another embodiment of a DC microgrid of the present invention.
Figure 3D:
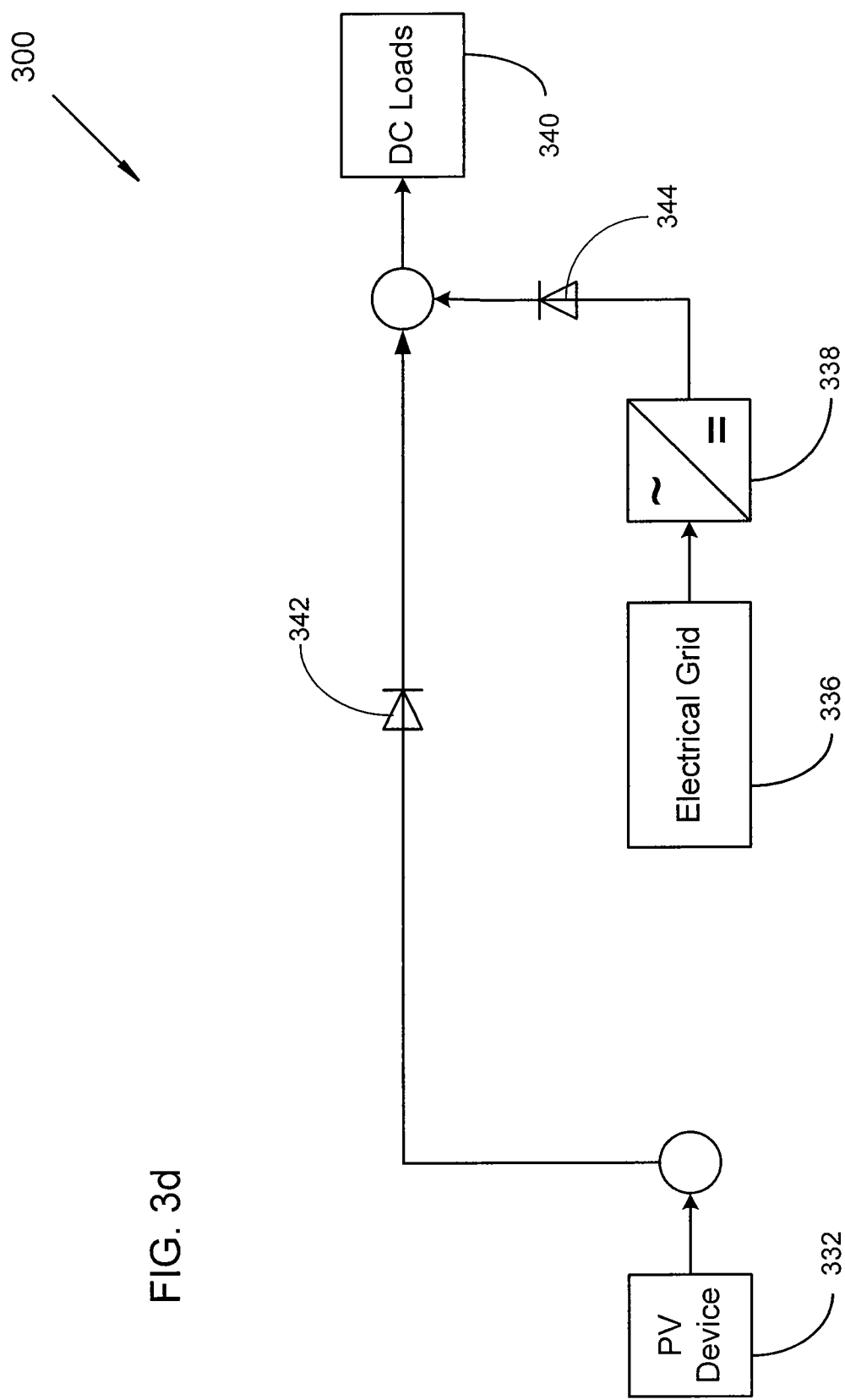
FIG. 3d is a block diagram of still another embodiment of a DC microgrid of the present invention.

In the alternative embodiment of FIG. 3c, a DC microgrid 300 is similar to DC microgrid 30, except that microgrid 300 does not include an inverter corresponding to inverter 34. DC loads 340 may be connected to the parallel combination of PV device 332 and DC power supply 338. DC microgrid 300 may be particularly suitable for an application in which a power output of PV array 332 is not expected to produce more power than is consumed by DC loads 340. Power supply 338 may convert AC power from grid 336 into DC power that is applied to DC loads 340. The output of power supply 338 may be controlled such that the output of PV array 332 is at the MPP. For example, the power output of PV array 332 may be controlled by changing the voltage output of power supply 338. As shown in FIG. 3d, isolation diodes 342, 344 may be provided to prevent backfeeding DC between PV device 332 and DC power supply 338.

According to one embodiment of the invention, the dynamic adjustment of the operating conditions of the DC loads and/or DC sources connected to the DC bus may be performed by a central control unit which communicates with, monitors, and controls (adjusts or varies) the DC loads of the building (e.g., HVAC, lighting, refrigeration, data center, Electric Vehicle (EV) charging, ventilation system, such as a ceiling fan for example, motors, etc.) and the DC sources (PV devices, DC power supply, etc.). Adjustments are done in such a way as to not dramatically or noticeably change the basic functions performed (e.g., HVAC speed is changed, but building temperature remains within the comfort level of occupants; EV charge rate varies throughout the day, but EV is still fully charged at the end of the day). Communication between the central control unit and DC loads and DC sources may be carried via wires or wirelessly. The control function may be integrated into other central building control devices, or may be implemented inside one of the other devices in the system (e.g., the central control function may be included within the DC power supply). Determining whether the PV devices are operating at MPP may be accomplished by monitoring the current and voltage at the PV devices, at the DC bus, or may be inferred by knowing the DC voltage and currents flowing in and out of the other DC loads and DC sources in the system. Similar "seeking" or other algorithms that are used in conventional MPPT implementations may also be employed in this inventive system (loads and/or sources are adjusted up and down until MPP is found).

The inventive system may have PV power-generating devices and a controllable, variable DC power supply to provide power to the DC loads at night and to support keeping the PV devices operating at or near MPP as the environmental conditions and/or loads vary. If the DC load(s) have a wide range and flexibility as to how much power they use, at what DC voltage/current combination they can operate at, and when the power is used (or stored in batteries or other energy storage devices), and if the PV array is sized correctly to the range of loads, system level MPPT may be possible without a DC power supply and/or without an inverter. For example, no DC power supply, DC optimizer, or inverter would be needed with a motor or other load which could be adjusted to operate at the desired voltage level on the 1-V curve of the PV device at or near MPP and at the power level available from the PV device at any given time. In similar cases where there is some excess PV power available at times, a small controllable and variable inverter could be incorporated, and in cases where there is not enough PV power available at times, a small controllable and variable DC power supply could be incorporated. In all these cases, system-level MPPT would eliminate or reduce the size of dedicated MPPT and power conversion circuits by utilizing the controllable and variable loads and sources to keep the PV devices operating at or near their MPP.

In systems where the PV device power output may exceed the possible power needs of the DC load at certain times, a reduced-size inverter may be connected to the DC bus as another controllable and variable DC load. The inverter may convert any excess PV power that cannot be utilized by any of the other DC loads into AC power to be used by other AC devices in the building/system and/or exported to the utility grid for credit (conventional net-metered PV arrangement). The inverter may have the MPPT circuit and algorithm eliminated, or the MPPT circuit and/or algorithm may still exist within the inverter and may support the system level MPPT function for cases when the PV system is generating more power than the DC loads can use. In any case, the size and cost of the PV inverter and optional MPPT circuit may be less than that of PV inverter(s) and/or DC converter(s) sized for the full output capacity of the PV components.

In another embodiment of the system-level MPPT concept, the DC output of the PV devices (e.g., a PV array) feeds directly into the same enclosure as the DC Power Supply, which may also contain the circuitry to monitor the current and voltage of the PV devices. Within the enclosure, the DC output of the PV devices may be combined with the DC Power Supply output to provide the output for the DC load(s). The central control function may also be included within the same enclosure, and may be able to control and vary the DC Power Supply based on the monitored PV devices' current and voltage in order to keep the PV devices operating at or near MPP. The control function may alternatively be integrated into other central building control devices, or may be implemented inside one of the other devices in the system. An advantage of having the PV device current and voltage monitored within the same enclosure as the DC Power Supply may be to limit the number of separate devices in the system. Another advantage is the ability to provide a "one-box" solution for simpler applications with lower system costs (e.g., applications where no inverter is needed). This concept may be implemented where variable, controllable DC loads and/or variable, controllable inverters are also managed by the central control as part of the system-level MPPT function as well as in applications where the loads are unmanaged, and only the DC Power Supply voltage or current is varied to provide the system level MPPT function.

Figure 4A:
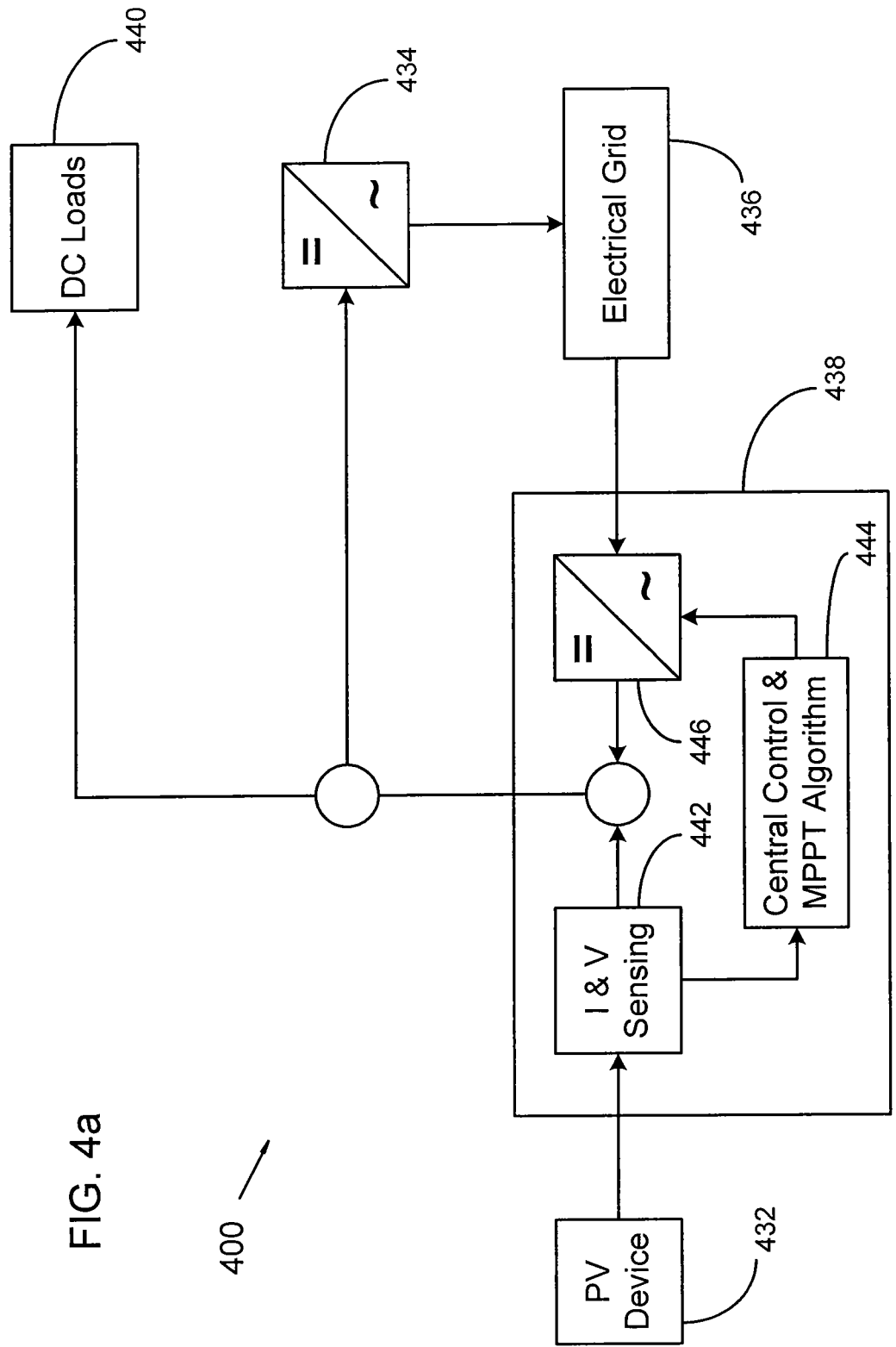
FIG. 4a is a block diagram of yet another embodiment of a DC microgrid of the present invention.

In FIG. 4a there is illustrated such a system including a DC microgrid 400 having a PV device 432, a variable inverter 434, an electrical grid 436, a DC power supply module 438 with a central control function, and DC loads 440. DC loads 440 may or may not be variable and controllable. DC power supply module 438 may include a current and voltage sensing module 442, a central control module and MPPT algorithm 444, and a controllable and variable DC power supply 446. Accordingly, PV input and central control may be integrated into a DC Power Supply. The central control module of element 444 may include a processor or ASIC, for example, for this purpose in cooperation with the MPPT algorithm of element 444.

DC loads 440 may be connected to the parallel combination of PV device 432 and DC power supply 446. PV device 432 may provide a variable DC current and voltage to current and voltage sensing module 442. Current and voltage sensing module 442 may then determine whether PV device 432 is operating at MPP. DC power supply 446 may convert AC power from grid 436 into DC power that is applied to DC loads 440. MPPT algorithm 444 may adjust the output of DC power supply 446 in order to keep PV array 432 at MPP (for example, voltage may be adjusted). Thus, a variable DC voltage may be provided to DC loads 440. In an embodiment in which DC loads 440 are variable and controllable, DC loads 440 and inverter 434 may also be controlled for more complex system level MPPT applications.

Figure 6:
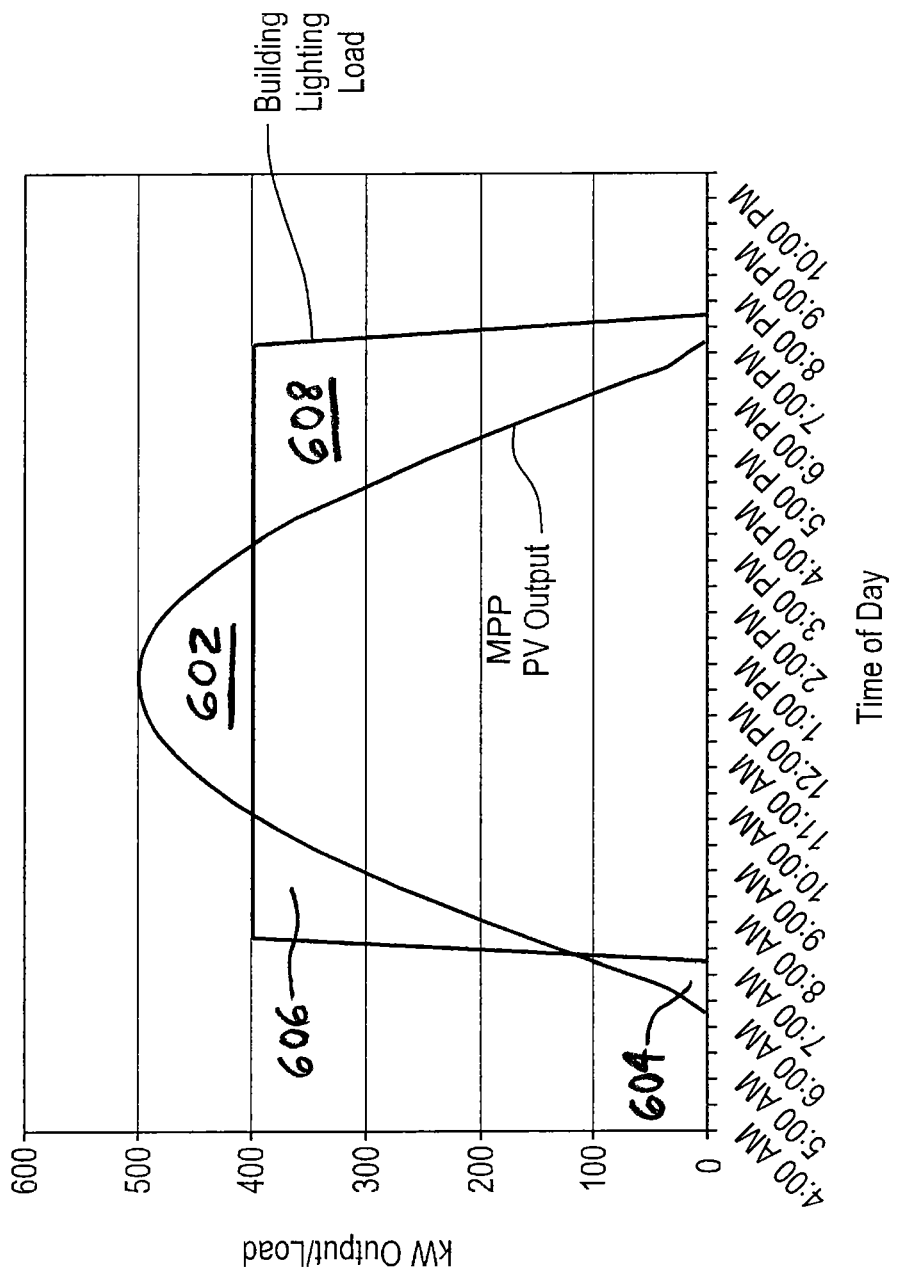
FIG. 6 is an example power vs. time of day plot for a DC microgrid and for an associated lighting load corresponding to another embodiment of the present invention.

FIG. 6 is an example power vs. time of day plot for DC micro grid 400 wherein PV device 432 is capable of generating more power at the MPP than is consumed by the building lighting load, as indicated in areas 602, 604. As shown, inverter 434 may be reduced from 500 kW to 100 kW by feeding PV voltage into DC lighting. When solar power is unavailable, or not sufficient to power the DC loads, then a rectifier in the form of DC power supply 446 may provide the balance of needed DC power to DC loads 440.

Figure 4B:
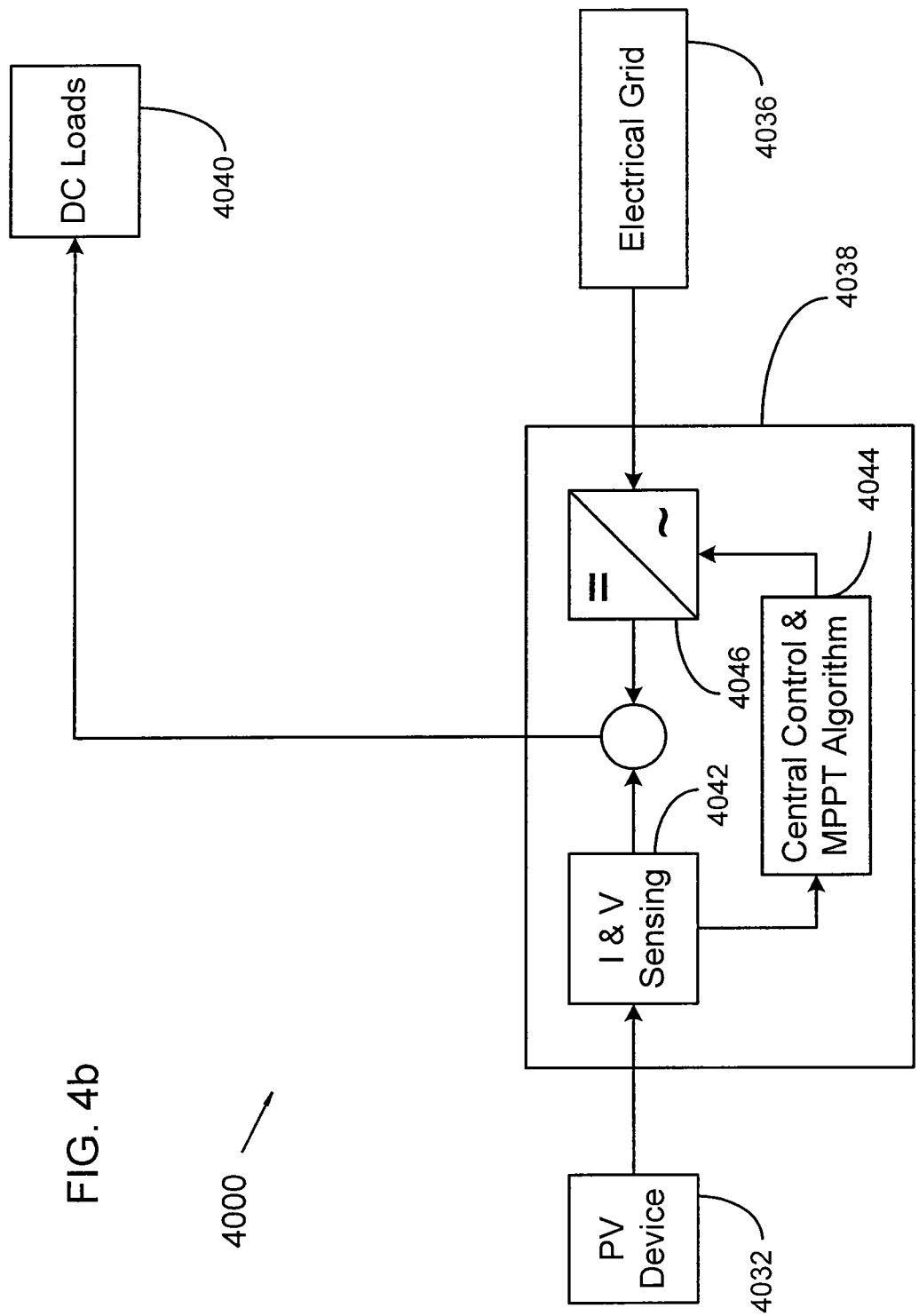
FIG. 4b is a block diagram of still another embodiment of a DC microgrid of the present invention.

In the alternative embodiment of FIG. 4b, a DC microgrid 4000 is similar to DC microgrid 400, except that microgrid 4000 does not include an inverter corresponding to inverter 434. DC microgrid 4000 may be particularly suitable for an application in which a power output of PV device 4032 is not expected to produce more power than is consumed by DC loads 4040. DC power supply 4046 may convert AC voltage from grid 4036 into DC voltage that is applied to DC loads 4040. The output of power supply 4046 may be controlled by central control and MPPT algorithm 4044, based on inputs from current and voltage sensing module 4042, such that the output of PV device 4032 is at the MPP. That is, the power output of PV device 4032 may be controlled by changing the voltage output of DC power supply 4046.

Figure 5:
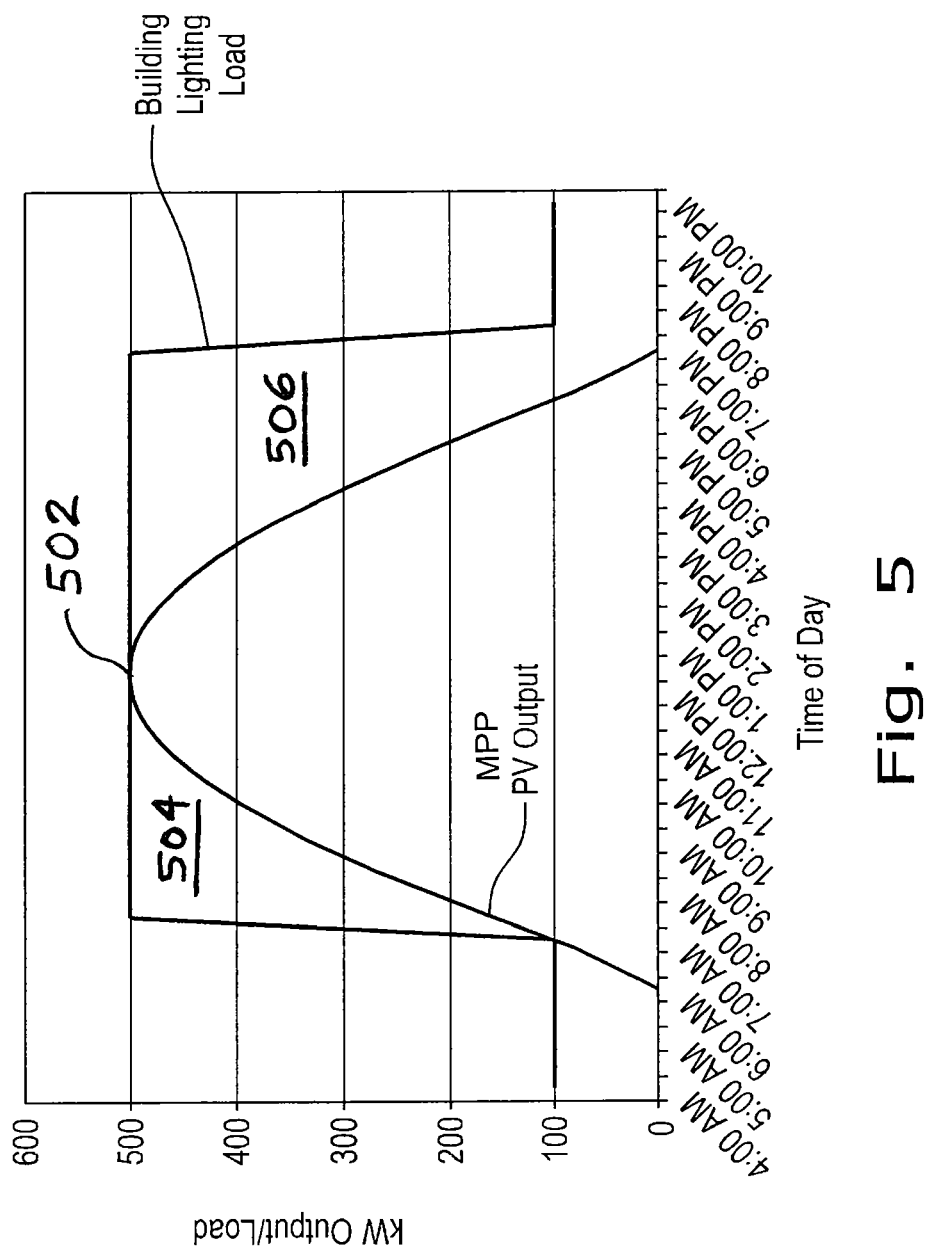
FIG. 5 is an example power vs. time of day plot for a DC microgrid and for an associated lighting load corresponding to one embodiment of the present invention.

FIG. 5 is an example power vs. time of day plot for DC microgrid 4000 wherein PV device 4032 is sized such that its power output at the MPP never exceeds the power consumed by the DC lighting load, as indicated at 502. When the output of PV device 4032 is insufficient to provide all of the DC power needed by the building load, as indicted in areas 504, 506, then variable power supply 4046 may provide the remaining DC power to be consumed by the building load. Thus, variable power supply 4046 may keep PV array 4032 operating at the MPP.

Controlling and varying the AC loads on the AC side of the inverter may also be part of the system level MPPT function, since a change in the AC load may translate to a corresponding change in the DC load on the DC bus side of the inverter. This may be most relevant in systems where the AC loads are isolated from the AC utility grid. An example would be controlling and varying an AC motor connected to an inverter, which translates the varying AC load to a varying DC load.

If the DC load includes a motor with associated drive circuitry (e.g., an industrial motor with variable frequency drive (VFD)), it is common for these motors to employ regenerative braking to slow down the motor. The regenerative braking can generate power that may be fed back into the DC bus and utilized by other DC loads. According to the invention, this feedback of DC power from the motor loads may also be managed by the central control as part of the system level MPPT function such that other DC loads in the system use the feedback power in the right amount in order to keep the PV devices operating at or near MPP.

The inverter and DC power supply may be combined into a bi-directional inverter that is controllable and variable in both directions (AC to DC and DC to AC) to support the system level MPPT function.

Instead of one central inverter on the PV array, one or more controllable and variable string inverters may be used on the individual parallel PV module strings. The string inverters may keep each string operating at or close to MPP, while also optimizing the intermediate DC bus voltage to the condition of the DC loads in order to minimize electrical losses.

In cases where it is advantageous to limit the DC bus voltage from the PV devices to a maximum value, for example, to some maximum rated voltage of one of the DC loads, or where it is advantageous to limit the system voltage to a maximum allowed value in an electrical or building code (e.g., 600 V maximum of the National Electrical Code), different voltage limiting strategies may be employed. One strategy may be to turn on or increase the variable loads as the PV voltage gets near the maximum limit in order to increase the load current and thus keep the system voltage generated by the PV devices below the maximum value (i.e., force PV device operation at a lower voltage point on the I-V curve). Another strategy may be to employ components and circuits using varistors, zener diodes, or similar components to "clamp" the voltage to below the maximum value. Although the PV devices may not be operating at MPP when the maximum voltage is being limited, these strategies may be especially useful to limit maximum voltage during conditions that may rarely occur, for example, extremely cold and windy conditions at a time of high solar irradiance. Employing these voltage limiting strategies would offer the option for a more optimized system design where potential maximum voltage conditions are the limiting factor to an optimized design.

In another embodiment, the DC source utilizes different energy sources other than the AC grid. Examples would be fuel cells and combined heat and power (CHP) devices. These DC power sources may also be controlled and varied in order to keep the PV device operating at or near the MPP.

In another embodiment, PV devices have DC optimizer(s) (or DC/DC converters) on their output, and system-level MPPT is performed using DC sources and DC loads on the DC bus after the DC optimizers. For example, the bus voltage between the DC optimizers and the DC loads could vary over a wider range instead of being closer to a fixed voltage, typical of conventional DC optimizers. This may allow simpler, less expensive DC optimizers with lower conversion losses since the DC optimizers would not need to perform as wide of a range of DC/DC voltage conversion.

Terminology:
MPPT=Maximum Power Point Tracking
MPP=Maximum Power Point
AC=Alternating Current
DC=Direct Current
PV=photovoltaic (solar electric)
PV Devices may include, e.g., PV cells, PV modules, strings of PV modules, or an entire PV array
EV=Electric Vehicle
Storage may be in the form of a battery, flywheel, thermal medium (e.g., hot water) or other method to store energy for later use.
DC loads may include any device with DC input that normally uses DC power. Such DC loads, may also generate power under certain conditions (e.g., motors, storage, EV charging, lighting, etc.).
DC sources may include any device that can generate DC power (e.g., a PV device, AC-to-DC power supply, fuel cell, combined heat and power (CHP) device, etc.).
Inverters may include any device that converts DC to AC for use by AC devices or to feed power back to the utility grid.
DC Power Supplies may include any device that converts AC (usually from utility grid) to DC for use by DC loads.
DC Optimizers may include a DC to DC converter that may also perform the MPPT function, and typically regulates the output voltage to a more constant range.
HVAC=Heating, Ventilation, Air Conditioning While this invention has been described as having an exemplary design, the present invention may be further modified within the spirit and scope of this disclosure. This application is therefore intended to cover any variations, uses, or adaptations of the invention using its general principles.

What is claimed is:

1. A method of controlling a photovoltaic system, the method comprising:
providing a photovoltaic device having a variable DC voltage output and a variable DC current output, the photovoltaic device having a combination of a voltage output level and a current output level corresponding to a predetermined, desired power point;

connecting a DC power supply in a parallel or series combination with the photovoltaic device, the DC power supply providing an electrical output and being powered by a source of energy other than the photovoltaic device;

connecting a DC load to the combination of the DC power supply and the photovoltaic device such that the DC load is powered by the combination; and adjusting a characteristic of the DC power supply such that the voltage output and the current output of the photovoltaic device substantially match the voltage output level and the current output level corresponding to the predetermined, desired power point.

2. The method of claim 1, further comprising connecting an isolation diode in series with at least one of the group including the photovoltaic device, the DC power supply, and the DC load.

3. The method of claim 1, wherein the characteristic of the DC power supply comprises a power output, current output, and/or voltage output of the DC power supply.

4. The method of claim 1, wherein the predetermined, desired power point is at or near a maximum power point.

5. The method of claim 1, wherein adjusting a characteristic of the DC power supply includes at least one of the group of maintaining and limiting the power output of the photovoltaic device within at least one of the group including a predetermined voltage range and a predetermined current range.

6. The method of claim 1, wherein adjusting a characteristic of the DC power supply includes at least one of the group of maintaining and limiting the voltage output of the photovoltaic device below a predetermined, maximum voltage.

7. The method of claim 1, wherein adjusting a characteristic of the DC power supply includes at least one of the group of maintaining and limiting the voltage output of the photovoltaic device above a predetermined, minimum voltage.

8. The method of claim 1, wherein adjusting a characteristic of the DC power supply includes at least one of the group of maintaining and limiting the current output of the photovoltaic device below a predetermined, maximum current.

9. The method of claim 1, wherein an operating power point of the photovoltaic device is determined by calculating a difference between a measured power going into substantially all DC loads within the system and a measured power coming out of substantially all the DC power sources in the system other than the photovoltaic device.

10. The method of claim 1, further comprising:
positioning the DC power supply within an enclosure;
feeding the variable DC voltage output and the variable DC current output of the photovoltaic device into the enclosure; and
connecting the DC power supply output in a parallel or series combination with the photovoltaic device output within the enclosure; and
incorporating isolation diodes and circuit protection within the enclosure.

11. The method of claim 10, further comprising providing a central control function within the enclosure to control the DC power supply.

12. The method of claim 11, further comprising
within the enclosure, monitoring the variable DC voltage output of the photovoltaic device and generating a monitored voltage;
within the enclosure, monitoring the variable DC current output of the photovoltaic device and generating a monitored current;
providing the monitored voltage and the monitored current to the central control function.

13. The method of claim 1, further comprising connecting a DC-to-DC converter between the photovoltaic device and the DC power supply.

14. The method of claim 13, further comprising providing a DC bus connecting the DC power supply and the DC load and adjusting a voltage or current of the DC bus to reduce losses in the DC-to-DC converter.

15. The method of claim 1, further comprising:
adjusting a characteristic of the DC load such that the voltage output and the current output of the photovoltaic device substantially match the voltage output level and the current output level corresponding to the predetermined, desired power point.

16. The method of claim 15, wherein the characteristic of the DC load comprises a power change, current change, and/or voltage change.

17. The method of claim 15, wherein the DC load includes a motor with a bi-directional DC Variable Frequency Drive (VFD) employing regenerative braking to the DC bus to slow down the motor speed, and wherein the regenerative braking function is monitored or controlled such that the voltage output and the current output of the photovoltaic device substantially match the voltage output level and the current output level corresponding to the predetermined, desired power point.

18. The method of claim 15, wherein adjusting a characteristic of the DC load includes at least one of the group of maintaining and limiting the power output of the photovoltaic device within at least one of the group including a predetermined voltage range and a predetermined current range.

19. The method of claim 15, where adjusting a characteristic of the DC load includes at least one of the group of maintaining and limiting the voltage output of the photovoltaic device below a predetermined, maximum voltage.

20. The method of claim 15, wherein adjusting a characteristic of the DC load includes at least one of the group of maintaining and limiting the voltage output of the photovoltaic device above a predetermined, minimum voltage.

21. The method of claim 15, wherein adjusting a characteristic of the DC load includes at least one of the group of maintaining and limiting the current output of the photovoltaic device below a predetermined, maximum current.

22. The method of claim 15, further comprising:
adjusting a characteristic of the DC load at substantially the same time the characteristic of the DC power supply is adjusted such that the voltage output and the current output of the photovoltaic device substantially match the voltage output level and the current output level corresponding to the predetermined, desired power point.

23. A method of controlling a photovoltaic system, the method comprising:
providing a photovoltaic device having a variable DC voltage output and a variable DC current output, the photovoltaic device having a combination of a voltage output level and a current output level corresponding to a predetermined, desired power point;

connecting a DC-to-AC inverter in series or parallel to a DC load such that the combination is powered by the photovoltaic device; and adjusting a load characteristic of the DC-to-AC inverter such that the voltage output and the current output of the photovoltaic device substantially match the voltage output level and the current output level corresponding to the predetermined, desired power point.

24. The method of claim 23, wherein an AC side of the DC-to-AC inverter is connected to the AC utility grid, allowing the inverter to act as a variable DC power load.

25. The method of claim 23, wherein an AC side of the DC-to-AC inverter is connected to a variable AC load, and adjusting the power draw of the AC load such that it has a corresponding effect on the DC load characteristic of the DC-to-AC inverter.

26. The method of claim 23, wherein the load characteristic of the DC-to-AC inverter comprises a power, current, and/or voltage.

27. The method of claim 23, further comprising:
adjusting a characteristic of a DC load at substantially the same time the load characteristic of the DC-to-AC inverter is adjusted such that the voltage output and the current output of the photovoltaic device substantially match the voltage output level and the current output level corresponding to the predetermined, desired power point.

28. The method of claim 23, wherein adjusting a characteristic of the DC-to-AC inverter includes at least one of the group of maintaining and limiting the power output of the photovoltaic device within at least one of the group including a predetermined voltage range and a predetermined current range.

29. The method of claim 23, wherein adjusting a characteristic of the DC-to-AC inverter includes at least one of the group of maintaining and limiting the voltage output of the photovoltaic device below a predetermined, maximum voltage.

30. The method of claim 23, wherein adjusting a characteristic of the DC-to-AC inverter includes at least one of the group of maintaining and limiting the voltage output of the photovoltaic device above a predetermined, minimum voltage.

31. The method of claim 23, wherein adjusting a characteristic of the DC-to-AC inverter includes at least one of the group of maintaining and limiting the current output of the photovoltaic device below a predetermined, maximum current.

32. A method of controlling a photovoltaic system, the method comprising:
providing a photovoltaic device having a variable DC voltage output and a variable DC current output, the photovoltaic device having a combination of a voltage output level and a current output level corresponding to a predetermined, desired power point;
connecting a DC power supply in a parallel or series combination with the photovoltaic device, the DC power supply providing an electrical output and being powered by a source of energy other than the photovoltaic device;
connecting a DC load and a DC-to-AC inverter to the combination of the DC power supply and the photovoltaic device such that the combination of the DC load and DC-to-AC inverter is powered by the combination of the DC power supply and the photovoltaic device; and when the power output of the photovoltaic device is at or below the power required by the DC load, adjusting a characteristic of the DC power supply such that the voltage output and the current output of the photovoltaic device substantially match the voltage output level and the current output level corresponding to the predetermined, desired power point, and the DC power supply is providing any extra power needed by the DC load which is not available from the photovoltaic device; and when the power output of the photovoltaic device is above the power required by the DC load, adjusting a load characteristic of the DC-to-AC inverter such that the voltage output and the current output of the photovoltaic device substantially match the voltage output level and the current output level corresponding to the predetermined, desired power point, and the DC-to-AC inverter is converting to AC utility grid power, or otherwise utilizing in an AC load, the extra power available from the photovoltaic device which is not required by the DC load.

33. The method of claim 32, wherein the DC power supply is connected to the utility grid and is also configured to act as the DC-to-AC inverter.

34. The method of claim 32, wherein a characteristic of the DC load is adjusted at the same time as a charactersistic of the DC power supply or a characteristic of the DC-to-AC inverter is adjusted.

35. The method of claim 32, comprising the further step of connecting an isolation diode in series with at least one of the group including the photovoltaic device, DC power supply, DC load, and DC-to-AC inverter.

36. The method of claim 32, wherein adjusting a characteristic of the DC power supply includes at least one of the group of maintaining and limiting the power output of the photovoltaic device within at least one of the group including a predetermined voltage range and a predetermined current range.

37. The method of claim 32, where adjusting a characteristic of the DC power supply includes at least one of the group of maintaining and limiting the voltage output of the photovoltaic device below a predetermined, maximum voltage.

38. The method of claim 32, wherein adjusting a characteristic of the DC power supply includes at least one of the group of maintaining and limiting the voltage output of the photovoltaic device above a predetermined, minimum voltage.

39. The method of claim 32, wherein adjusting a characteristic of the DC power supply includes at least one of the group of maintaining and limiting the current output of the photovoltaic device below a predetermined, maximum current.

40. The method of claim 32, wherein adjusting a characteristic of the DC-to-AC inverter includes at least one of the group of maintaining and limiting the power output of the photovoltaic device within at least one of the group including a predetermined voltage range and a predetermined current range.

41. The method of claim 32, wherein adjusting a characteristic of the DC-to-AC inverter includes at least one of the group of maintaining and limiting the voltage output of the photovoltaic device below a predetermined, maximum voltage.

42. The method of claim 32, wherein adjusting a characteristic of the DC-to-AC inverter includes at least one of the group of maintaining and limiting the voltage output of the photovoltaic device above a predetermined, minimum voltage.

43. The method of claim 32, wherein adjusting a characteristic of the DC-to-AC inverter includes at least one of the group of maintaining and limiting the current output of the photovoltaic device below a predetermined, maximum current.

44. A method of controlling a photovoltaic system, the method comprising:
providing a photovoltaic device having a variable DC voltage output and a variable DC current output, the photovoltaic device having a combination of a voltage output level and a current output level corresponding to a predetermined, desired power point;
connecting multiple DC loads in a parallel or series combination with each other to the photovoltaic device such that the combination of the DC loads is powered by the photovoltaic device; and
adjusting a characteristic of one or more of the multiple DC loads such that the voltage output and the current output of the photovoltaic device substantially match the voltage output level and the current output level corresponding to the predetermined, desired power point.

45. The method of claim 44, wherein the characteristic of the DC loads comprises a power change, current change, and/or voltage change.

46. The method of claim 44, wherein the DC loads includes a motor with a bi-directional DC Variable Frequency Drive (VFD) employing regenerative braking to the DC bus to slow down the motor speed, and wherein the regenerative braking function is monitored or controlled such that the voltage output and the current output of the photovoltaic device substantially match the voltage output level and the current output level corresponding to the predetermined, desired power point.

47. The method of claim 44, wherein adjusting a characteristic of the DC loads includes at least one of the group of maintaining and limiting the power output of the photovoltaic device within at least one of the group including a predetermined voltage range and a predetermined current range.

48. The method of claim 44, wherein adjusting a characteristic of the DC loads includes at least one of the group of maintaining and limiting the voltage output of the photovoltaic device below a predetermined, maximum voltage.

49. The method of claim 44, wherein adjusting a characteristic of the DC loads includes at least one of the group of maintaining and limiting the voltage output of the photovoltaic device above a predetermined, minimum voltage.

50. The method of claim 44, wherein adjusting a characteristic of the DC loads includes at least one of the group of maintaining and limiting the current output of the photovoltaic device below a predetermined, maximum current.

* * * * *